US011926509B2

(12) United States Patent
Kanda et al.

(10) Patent No.: US 11,926,509 B2
(45) Date of Patent: Mar. 12, 2024

(54) CRANE

(71) Applicant: TADANO LTD., Kagawa (JP)

(72) Inventors: Shinsuke Kanda, Kagawa (JP); Kazuma Mizuki, Kagawa (JP)

(73) Assignee: TADANO LTD., Kagawa (JP)

(*) Notice: Subject to any disclaimer, the term of this patent is extended or adjusted under 35 U.S.C. 154(b) by 793 days.

(21) Appl. No.: 17/041,231

(22) PCT Filed: Jul. 18, 2019

(86) PCT No.: PCT/JP2019/028280
§ 371 (c)(1),
(2) Date: Sep. 24, 2020

(87) PCT Pub. No.: WO2020/017594
PCT Pub. Date: Jan. 23, 2020

(65) Prior Publication Data

US 2021/0009385 A1 Jan. 14, 2021

(30) Foreign Application Priority Data

Jul. 18, 2018 (JP) ................................ 2018-135406

(51) Int. Cl.
*B66C 13/06* (2006.01)
*B66C 13/30* (2006.01)

(52) U.S. Cl.
CPC .......... *B66C 13/063* (2013.01); *B66C 13/066* (2013.01); *B66C 13/30* (2013.01)

(58) Field of Classification Search
CPC ..... B66C 13/063; B66C 13/066; B66C 13/30; B66C 13/46; B66C 23/701; B66C 23/86; B66C 13/22; B66C 23/00
See application file for complete search history.

(56) References Cited

U.S. PATENT DOCUMENTS 5,908,122 A * 6/1999 Robinett ............... B66C 13/063 901/17
6,442,439 B1 * 8/2002 Robinett, III ......... B66C 13/063 212/199
2015/0012188 A1 * 1/2015 Scheider .............. B66C 13/063 701/50

FOREIGN PATENT DOCUMENTS

JP 2005-067747 A 3/2005
JP H11130395 A * 12/2007 ............ B60C 23/00
(Continued)

OTHER PUBLICATIONS

JPH11130395A_English Translation (Year: 2007).*
(Continued)

*Primary Examiner* — Rachid Bendidi
*Assistant Examiner* — Dana F Artimez
(74) *Attorney, Agent, or Firm* — Paratus Law Group, PLLC

(57) ABSTRACT

This crane is provided with: a operable functional part that is supported on a pair of lower bases; a driving device; a detection unit that detects information about the attitude of the operable functional part; a target signal generation unit that generates a target signal regarding the moving direction and the moving speed of a suspended load on the basis of information about an operation input for instructing the moving direction and the moving speed of the suspended load; a filter unit that generates a filtering target signal by filtering the target signal; a control signal generation unit that generates a speed control signal for controlling the operation speed of the driving device on the basis of the information about the attitude and the filtering target signal; and a control unit that controls the driving device on the basis of the speed control signal.

6 Claims, 9 Drawing Sheets

(56) References Cited

FOREIGN PATENT DOCUMENTS

| | | |
|---|---|---|
| JP | 2016-160081 A | 9/2016 |
| JP | 2018-070321 A | 5/2018 |
| JP | 2018-087069 A | 6/2018 |

OTHER PUBLICATIONS

Oct. 1, 2019, International Search Report issued for related PCT application No. PCT/JP2019/028280.

Oct. 1, 2019, International Search Opnion issued for related PCT application No. PCT/JP2019/028280.

Mar. 17, 2022, European Search Report issued for related EP Application No. 19837203.9.

* cited by examiner

CRANE

CROSS REFERENCE TO PRIOR APPLICATION

This application is a National Stage Patent Application of PCT International Patent Application No. PCT/JP2019/028280 (filed on Jul. 18, 2019) under 35 U.S.C. § 371, which claims priority to Japanese Patent Application No. 2018-135406 (filed on Jul. 18, 2018), which are all hereby incorporated by reference in their entirety.

TECHNICAL FIELD

The present invention relates to a crane.

BACKGROUND ART

Conventionally, when a load is conveyed by a crane, the load vibrates. Such vibration is vibration of a single pendulum whose material point is a load suspended on a distal end of a wire rope or a double pendulum whose fulcrum is a hook part caused by acceleration applied during the conveyance as a vibratory force.

In such a crane, an operator needs to perform an operation of canceling shaking of the load by turning or raising an elongation/contraction boom by a manual operation of an operation tool in order to stably lower the load at a predetermined position. For this reason, conveyance efficiency of the crane is affected by the amount of shaking generated during the conveyance and a skill level of the crane operator.

Therefore, there is known a crane that suppresses shaking of a load and improves conveyance efficiency by damping a frequency component of a resonance frequency of the load with a speed command (basic control signal) of a driving device (also referred to as actuator) of the crane (see, for example, Patent Literature 1).

The crane described in Patent Literature 1 is a crane device that moves with a load suspended on a wire rope hung from a trolley. The crane calculates a resonance frequency of a pendulum calculated on the basis of a suspended length of the wire rope.

In addition, the crane generates a time delay filter on the basis of the calculated resonance frequency. The crane suppresses the vibration of the load during conveyance by moving the trolley according to a corrected trolley speed command obtained by applying the time delay filter to a trolley speed command.

In addition, the crane removes the resonance frequency component by inputting the filter independently to a traveling input operation signal to move a crane main body by a traveling device and a traverse input operation signal to move the trolley along a boom.

When a traveling input operation and a traverse input operation are performed at the same time in such a crane, the load is conveyed along a locus obtained by combining a locus of the travel input operation signal and a locus of the transverse input operation signal from which the resonance frequency components have been removed.

However, the combined locus becomes a geometrically non-linear locos depending on operation states of the traveling input operation and the transverse input operation, and there is a case where the load being conveyed is shaken even if the filter is applied.

CITATION LIST

Patent Literature

Patent Literature 1: JP 2016-160081 A

SUMMARY OF THE INVENTION

Problems to be Solved by the Invention

An object of the present invention is to provide a crane that can convey a load along a locus suitable for conveyance of a load while suppressing shaking of the load.

Solutions to Problems

One mode of a crane according to the present invention is provided with: a operable functional part that is supported on a pair of lower bases in a state where it can be turned, raised, and elongated/contracted; a driving device that drives the operable functional part; a detection unit that detects information about the attitude of the operable functional part; a target signal generation unit that generates a target signal regarding the moving direction and the moving speed of a suspended load on the basis of information about an operation input for instructing the moving direction and the moving speed of the suspended load; a filter unit that generates a filtering target signal by filtering the target signal; a control signal generation unit that generates a speed control signal for controlling the operation speed of the driving device on the basis of the information about the attitude and the filtering target signal; and a control unit that controls the driving device on the basis of the speed control signal.

Effects of the Invention

According to the present invention, it is possible to realize the crane that can convey the load along the locus suitable for the conveyance of the load while suppressing the shaking of the load.

DESCRIPTION OF EMBODIMENTS

Hereinafter, a crane 1 according to an embodiment of the present invention will be described with reference to FIGS. 1 to 4. Note that a mobile crane (rough terrain crane) is described as the crane 1 in the present embodiment, but a truck crane or the like may be used.

Figure 1:
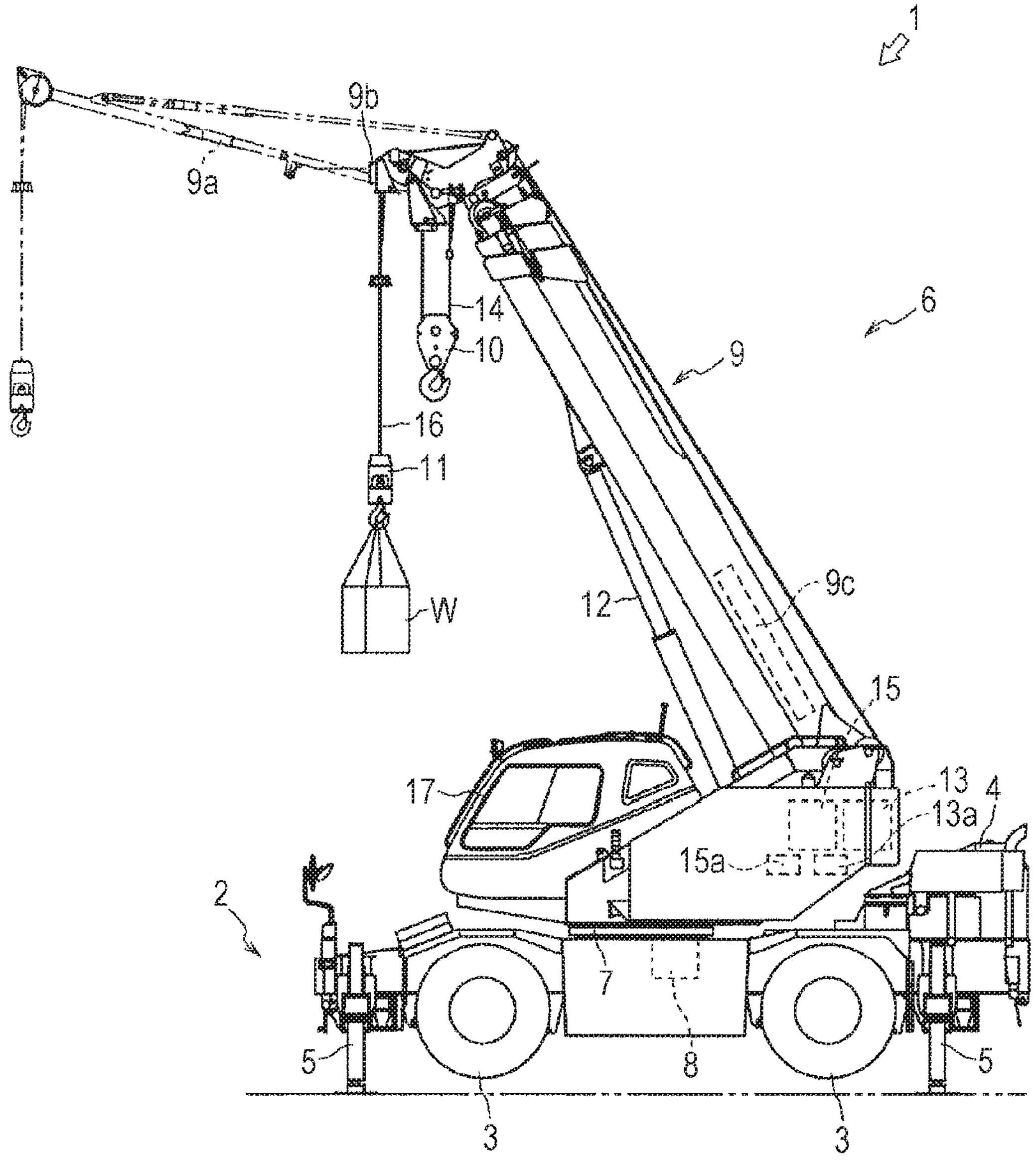
FIG. 1 is a side view illustrating an overall configuration of a crane.

As illustrated in FIG. 1, the crane 1 is the mobile crane that can move to an unspecified place. The crane 1 includes a vehicle 2, a crane device 6, and the like.

The vehicle 2 corresponds to an example of a lower base body and is a traveling vehicle that conveys the crane device 6. The vehicle 2 has a plurality of wheels 3 and travels with an engine 1 as a power source. The vehicle 2 is provided with an outrigger 5. The outrigger 5 is constituted by a projecting beam that can be hydraulically extended on both sides in a width direction of the vehicle 2 and a hydraulic jack cylinder that can be extended in a direction perpendicular to the ground.

The vehicle 2 can expand an operable range of the crane 1 by extending the outrigger 5 in the width direction of the vehicle 2 and grounding the jack cylinder. Note that the lower base body may be a lower base body that can travel or a lower base body that is incapable of traveling.

The crane device 6 is working machine that lifts a load N with a wire rope. The crane device 6 includes a turning base 7, a boom 9, a jib 9*a*, a main hook block 10, a sub hook block 11, a raising hydraulic cylinder 12, a main winch 13, a main wire rope 14, a sub winch 15, a sub wire rope 16, a cabin 17, a control device 31, an operation terminal 32, and the like.

The turning base 7 is a device that allows the crane device 6 to turn. The turning base 7 is provided on a frame of the vehicle 2 via an annular bearing. The turning base 7 is configured to be rotatable about a center of the annular bearing as a center of rotation.

The turning base 7 is provided with a hydraulic turning hydraulic motor 8 which is a driving device. The turning base 7 is configured to be capable of turning in a first direction and a second direction opposite to the first direction by the turning hydraulic motor 8.

The turning hydraulic motor 8 is the driving device that is rotationally operated by a turning valve 22 (see FIG. 2) which is an electromagnetic proportional switching valve. The turning valve 22 can control a flow rate of hydraulic oil supplied to the turning hydraulic motor 8 to an arbitrary flow rate.

In other words, the turning base 7 is configured to be controllable to an arbitrary turning speed via the turning hydraulic motor 8 rotatably operated by the turning valve 22. The turning base 7 is provided with a turning sensor 27 (see FIG. 2) which is turning angle detection means for detecting a turning position (angle) and a turning speed of the turning base 7.

The turning hydraulic motor 8 corresponds to an example of the driving device. In addition, the turning hydraulic motor 8 also corresponds to an example of a turning drive unit. The turning sensor 27 corresponds to an example of a detection unit that detects information about the attitude of the boom 9 that is a operable functional part. The information about the attitude may include, for example, a turning angle of the boom 9, a raising angle of the boom 9, and an elongation/contraction length of the boom 9.

The boom 9 corresponds to an example of the operable functional part, and is provided in the vehicle 2, which is the lower base body, in a state where it can be turned, raised, and elongated/contracted. The boom 9 is a movable prop that supports the wire rope to a state of being capable of lifting the load W.

The boom 9 is constituted by a plurality of boom members. The boom 9 is configured to be freely elongated/contracted in an axial direction by moving each boom member with an elongation/contraction hydraulic cylinder 9*c* which is a driving device. The elongation/contraction hydraulic cylinder 9*c* corresponds to an example of the driving device that drives the boom 9 which is the operable functional part. The elongation/contraction hydraulic cylinder 9*c* also corresponds to an example of an elongation/contraction drive unit.

The boom 9 is provided such that a proximal end of a base boom member is swingable substantially at the center of the turning base 7. In addition, the boom 9 is provided with the jib 9*a* and a boom camera 9*b* for photographing the load W.

The elongation/contraction hydraulic cylinder 9*c* is the driving device that is operated to be elongated/contracted by an elongation/contraction valve 23 (see FIG. 2) which is an electromagnetic proportional switching valve. The elongation/contraction valve 23 can control a flow rate of hydraulic oil supplied to the elongation/contraction hydraulic cylinder 9*c* to an arbitrary flow rate.

That is, the boom 9 is configured to be controllable to an arbitrary boom length by the elongation/contraction valve 23. The boom 9 is provided with an elongation/contraction sensor 28 and a direction sensor 29 which are elongation/contraction length detection means for detecting the length of the boom 9. The elongation/contraction sensor 28 corresponds to an example of the detection unit that detects information about the attitude of the boom 9 that is the operable functional part.

The main hook block 10 and the sub hook block 11 are suspenders for suspending the load W. The main hook block 10 is provided with a plurality of hook sheaves around which the main wire rope 14 is wound, and a main hook for suspending the load W. The sub hook block 11 is provided with a sub hook for suspending the load W.

The raising hydraulic cylinder 12 is the driving device that raises and lowers the boom 9 and holds the attitude of the boom 9. The raising hydraulic cylinder 12 is constituted by a cylinder part and a rod part. An end (proximal end) of the cylinder part is swingably connected to the turning base 7. An end (distal end) of the rod part is swingably connected to the base boom member of the boom 9. The raising hydraulic cylinder 12 corresponds to an example of the driving device. The raising hydraulic cylinder 12 also corresponds to an example of a raising drive unit.

The raising hydraulic cylinder 12 is operated to be elongated/contracted by a raising valve 24 (see FIG. 2) which is an electromagnetic proportional switching valve. The raising valve 24 can control a flow rate of hydraulic oil supplied to the raising hydraulic cylinder 12 to an arbitrary flow rate.

That is, the boom 9 is configured to be controllable to an arbitrary raising speed by the raising valve 24. The boom 9 is provided with a raising sensor 30 (see FIG. 2) which is raising angle detection means for detecting a raising angle $\theta$ of the boom 9. The raising sensor 30 corresponds to an example of the detection unit that detects information about the attitude of the boom 9 that is the operable functional part.

The main winch 13 and the sub winch 15 are winding devices that wind up (reel up) and feed out (release) the main wire rope 14 and the sub wire rope 16.

The main winch 13 is configured such that a main drum around which the main wire rope 14 is wound is rotated by a main hydraulic motor 13*a*, which is a driving device, and the sub winch 15 is configured such that a sub drum around which the sub wire rope 16 is wound is rotated by a sub hydraulic motor 15*a* which is a driving device.

The main hydraulic motor 13*a* is rotationally operated by a main valve 25*m* (see FIG. 2) which is an electromagnetic proportional switching valve. The main valve 25*m* can control a flow rate of hydraulic oil supplied to the main hydraulic motor 13*a* to an arbitrary flow rate.

In other words, the main winch 13 is configured to be controllable to an arbitrary winding-up and feeding-out speed by the main valve 25*m*. Similarly, the sub winch 15 is configured to be controllable to an arbitrary winding-up and feeding-out speed by a sub valve 25*s* (see FIG. 2) which is an electromagnetic proportional switching valve.

Each of the main winch 13 and the sub winch 15 is provided with a winding sensor 26 (see FIG. 2) that detects each fed-out amount 1 of the main wire rope 14 and the sub wire rope 16.

The cabin 17 is an operator's seat covered with a housing 33. The cabin 17 is mounted on the turning base 7. The cabin 17 is provided with the operator's seat (not illustrated). The operator's seat is provided with an operation tool for operating the vehicle 2 to travel and a turning operation tool 18 for operating the crane device 6, a raising operation tool 19, an elongation/contraction operation tool 20, a main drum operation tool 21*m*, a sub drum operation tool 21*s*, and the like (see FIG. 2).

The turning operation tool 18 controls the turning hydraulic motor 8 by operating the turning valve 22. The raising operation tool 19 controls the raising hydraulic cylinder 12 by operating the raising valve 24. The elongation/contraction operation tool 20 controls the elongation/contraction hydraulic cylinder 9*c* by operating the elongation/contraction valve 23.

The main drum operation tool 21*m* controls the main hydraulic motor 13*a* by operating the main valve 25*m*. The sub drum operation tool 21*s* controls the sub hydraulic motor 15*a* by operating the sub valve 25*s*.

Figure 2:
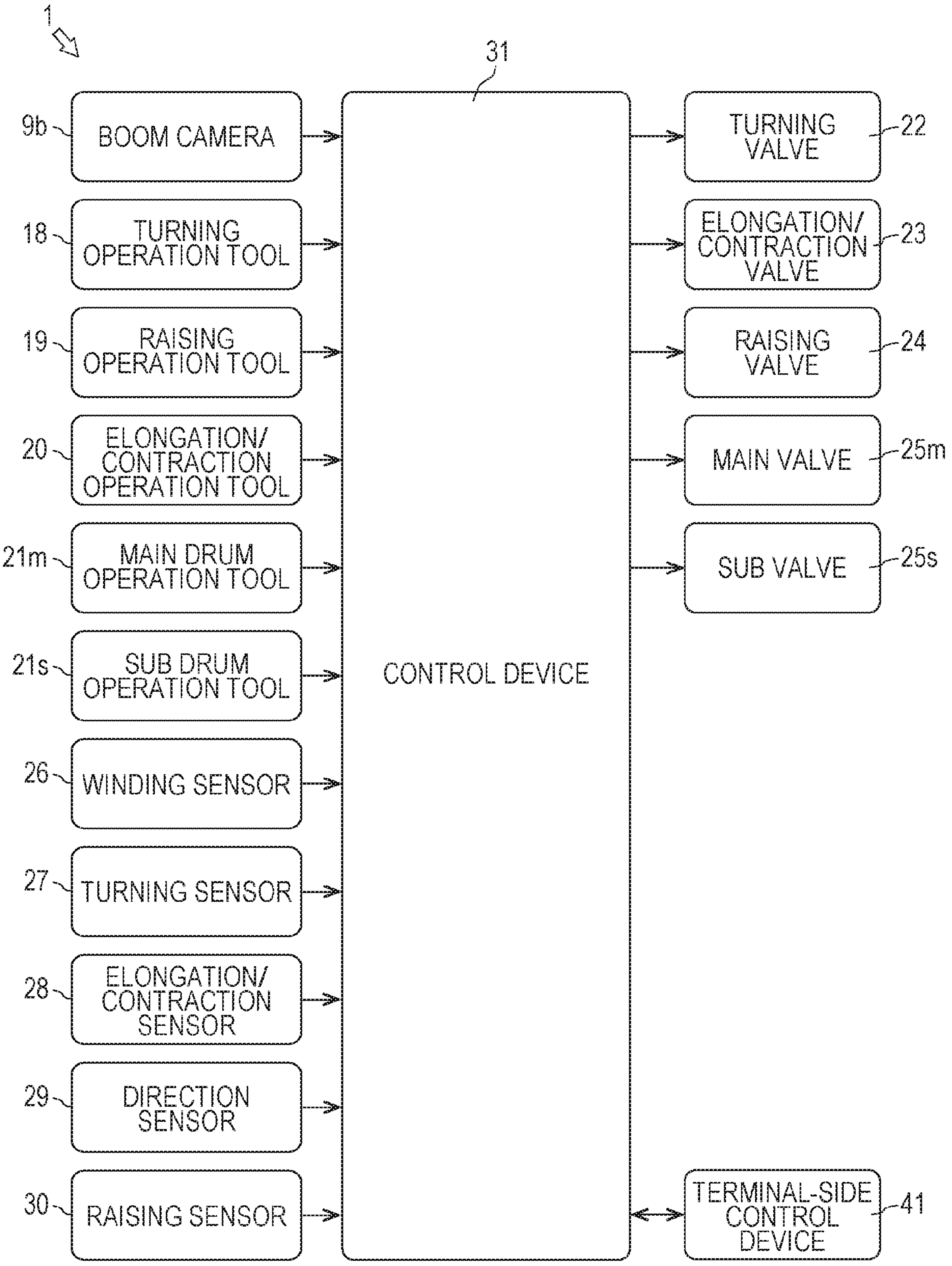
FIG. 2 is a block diagram illustrating a control configuration of the crane.

As illustrated in FIG. 2, the control device 31 corresponds to an example of a control unit, and controls the driving device of the crane device 6 via each operation valve. The control device 31 is provided in the cabin 17. In practice, the control device 31 may be configured such that a CPU, a RCM, a RAM, an HDD, ant the like are connected via a bus, or may be configured using a one-chip LSI or the like. The control device 31 stores various programs and data for controlling the operation of each of the driving devices, the switching valves, the sensors, and the like.

The control device 31 is connected to the boom camera 9*b*, the turning operation tool 18, the raising operation tool 19, the elongation/contraction operation tool 20, the main drum operation tool 21*m*, and the sub drum operation tool 21*s*. The control device 31 acquires an image i from the boom camera 9*b*.

The control device 31 acquires each operation amount of the turning operation tool 18, the raising operation tool 19, the main drum operation tool 21*m*, and the sub drum operation tool 21*s* on the basis of the image i acquired from the boom camera 9*b*.

The control device 31 is connected to a terminal-side control device 41 of the operation terminal 32, and acquires a target speed signal Vd from the operation terminal 32.

The control device 31 is connected to the turning valve 22, the elongation/contraction valve 23, the raising valve 24, the main valve 25*m*, and the sub valve 25*s*, and transfers an operation signal Md to the turning valve 22, the raising valve 24, the main valve 25*m*, and the sub valve 25*s*.

The control device 31 is connected to the winding sensor 26, the turning sensor 27, the elongation/contraction sensor 28, the direction sensor 29, and the raising sensor 30. The control device 31 acquires information about the fed-out amount 1 of the main wire rope 14 and/or the sub wire rope 16 (hereinafter, the main wire rope 14 and the sub wire rope 16 are collectively referred to as "wire rope") from the winding sensor 26.

The control device 31 acquires information about a turning angle φ of the turning base 7 from the turning sensor 27. The control device 31 acquires information about an elongation/contraction length τ of the boom 9 from the elongation/contraction sensor 28. The control device 31 acquires information about a direction from the direction sensor 29. The control device 31 acquires information about a raising angle θ of the boom 9 from the raising sensor 30.

The control device 31 generates the operation signal Md corresponding to each operation tool on the basis of each operation amount of the turning operation tool 18, the raising operation tool 19, the elongation/contraction operation tool 20, the main drum operation tool 21*m*, and the sub drum operation tool 21*s*.

The crane 1 configured in this manner can move the crane device 6 to an arbitrary position by causing the vehicle 2 to travel. In addition, the crane 1 extends the boom 9 to an arbitrary length with the operation of the elongation/contraction operation tool 20 in a state where the boom 9 is raised at an arbitrary raising angle θ by the raising hydraulic cylinder 12 with the operation of the raising operation tool 19, and thus, a lifting height and an operating radius of the crane device 6 can be increased.

In addition, the crane 1 conveys the load W by rotating the turning base 7 with the operation of the turning operation tool 18 in a state where the load W is lifted by the sub drum operation tool 21*s* and the like.

Figure 3:
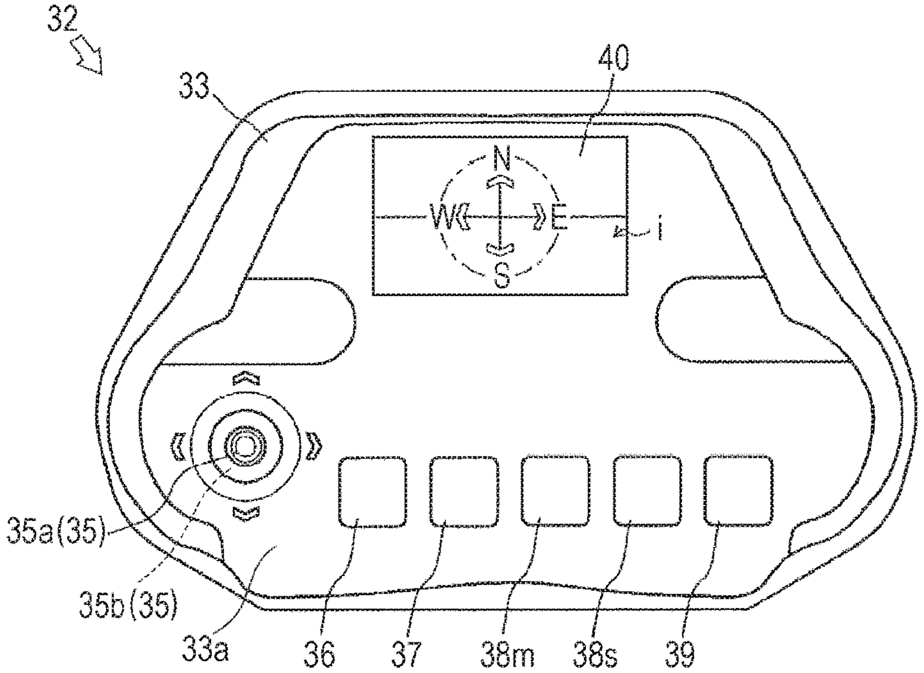
FIG. 3 is a plan view illustrating a schematic configuration of an operation terminal.

As illustrated in FIG. 3, the operation terminal 32 is a terminal that inputs the target speed signal Vd regarding a moving direction and a moving speed for movement of the load W. Such an operation terminal 32 is provided in the cabin 17.

The operation terminal 32 includes the housing 33, a suspended load moving operation tool 35, a terminal-side turning operation tool 36, a terminal-side elongation/contraction operation tool 37, a terminal-side main drum operation tool 38*m*, a terminal-side sub drum operation tool 38*s*, a terminal-side raising operation tool 39, a terminal-side display device 40, the terminal-side control device 41 (see FIGS. 2 and 4), and the like. In addition, the operation terminal 32 also includes a terminal-side direction sensor 34 that detects information about a direction.

The operation terminal 32 transmits the target speed signal Vd of the load W, generated by operating the suspended load moving operation tool 35 or the various operation tools 36 to 39, to the control device 31 of the crane device 6. The target speed signal. Vd corresponds to an example of a target signal.

The housing 33 is a main component of the operation terminal 32. The housing 33 has an operation surface 33*a*. The housing 33 has a size that can be manually held by an operator. The housing 33 includes the suspended load moving operation tool 35, the terminal-side turning operation tool 36, the terminal-side elongation/contraction operation tool 37, the terminal-side main drum operation tool 38*m*, the terminal-side sub drum operation tool 38*s*, the terminal-side raising operation tool 39, and the terminal-side display device 40 on the operation surface 33*a* in order from the left side of the operator The suspended load moving operation tool 35 is an operation tool that is operated at the time of inputting an instruction regarding the moving direction and the moving speed of the load W on the horizontal plane. The suspended load moving operation tool 35 corresponds to an example of an operation unit and an operation input unit.

The suspended load moving operation tool 35 is constituted by an operation stick 35*a* that is erected to be substantially perpendicular from the operation surface of the housing 33, and a sensor 35*b* that detects a tilt direction and a tilt amount of the operation stick 35*a*. The suspended load moving operation tool 35 is configured such that the operation stick 35*a* can be tilted in an arbitrary direction.

In the suspended load moving operation tool 35, an upward direction toward the operation surface 33*a* (hereinafter, simply referred to as "upward direction") coincides with the extending direction of the boom 9. The suspended load moving operation tool 35 transfers an operation signal regarding the tilt direction and the tilt amount of the operation stick 35*a* detected by the sensor 35*b* to the terminal-side control device 41.

The operator inputs the moving direction and moving speed of the suspended load by operating the operation stick 35*a*. The input regarding the moving direction of the suspended load corresponds to the tilt direction of the operation stick 35*a*. In addition, the input regarding the moving speed of the suspended load corresponds to the tilt amount of the operation stick 35*a*.

The terminal-side turning operation tool 36 is an operation tool for inputting an instruction regarding a turning direction and an instruction regarding a turning speed of the crane device 6 on the basis of the operation of the operator. The terminal-side elongation/contraction operation tool 37 is an operation tool for inputting an instruction regarding an elongation/contraction direction of the boom 9 (instruction regarding elongation or contraction) and an instruction regarding a speed thereof on the basis of the operation of the operator.

The terminal-side main drum operation tool 38*m* is an operation tool for inputting as instruction regarding a rotation direction of the main winch 13 (instruction regarding reeling-up or releasing) and an instruction regarding a speed thereof on the basis of the operation of the operator.

The terminal-side sub drum operation tool 38*s* is an operation tool for inputting an instruction regarding a rotation direction of the sub winch 15 (instruction regarding reeling-up or releasing) and an instruction regarding a speed thereof on the basis of the operation of the operator.

The terminal-side raising operation tool 39 is an operation tool for inputting an instruction regarding a raising direction of the boom 9 (instruction regarding raising or lowering) and an instruction regarding a speed thereof on the basis of the operation of the operator.

Each of the operation tools 35 to 39 is constituted by the operation stick that is erected to be substantially perpendicular from the operation surface 33*a* of the housing 33, and the sensor (not illustrated) that detects the tilt direction and the tilt amount of the operation stick. Each operation tool is configured to be tiltable in the first direction and the second direction Each of the operation tools 35 to 39 corresponds to an example of the operation input unit. In addition, the operation stick of each of the operation tools 35 to 39 corresponds to an example of the operation unit and an example of the operation input unit.

The terminal-side display device 40 displays various types of information such as the information about the attitude of the crane 1 and the information about the load W. The terminal-side display device 40 is configured using an image display device such as a liquid crystal screen. The terminal-side display device 40 is provided on the operation surface 33*a* of the housing 33.

A direction is displayed on the terminal-side display device 40 on the basis of a detection value of the terminal-side direction sensor 34. In the direction displayed on the terminal-side display device 40, the upward direction toward the terminal-side display device 40 coincides with the extending direction of the boom 9.

Figure 4:
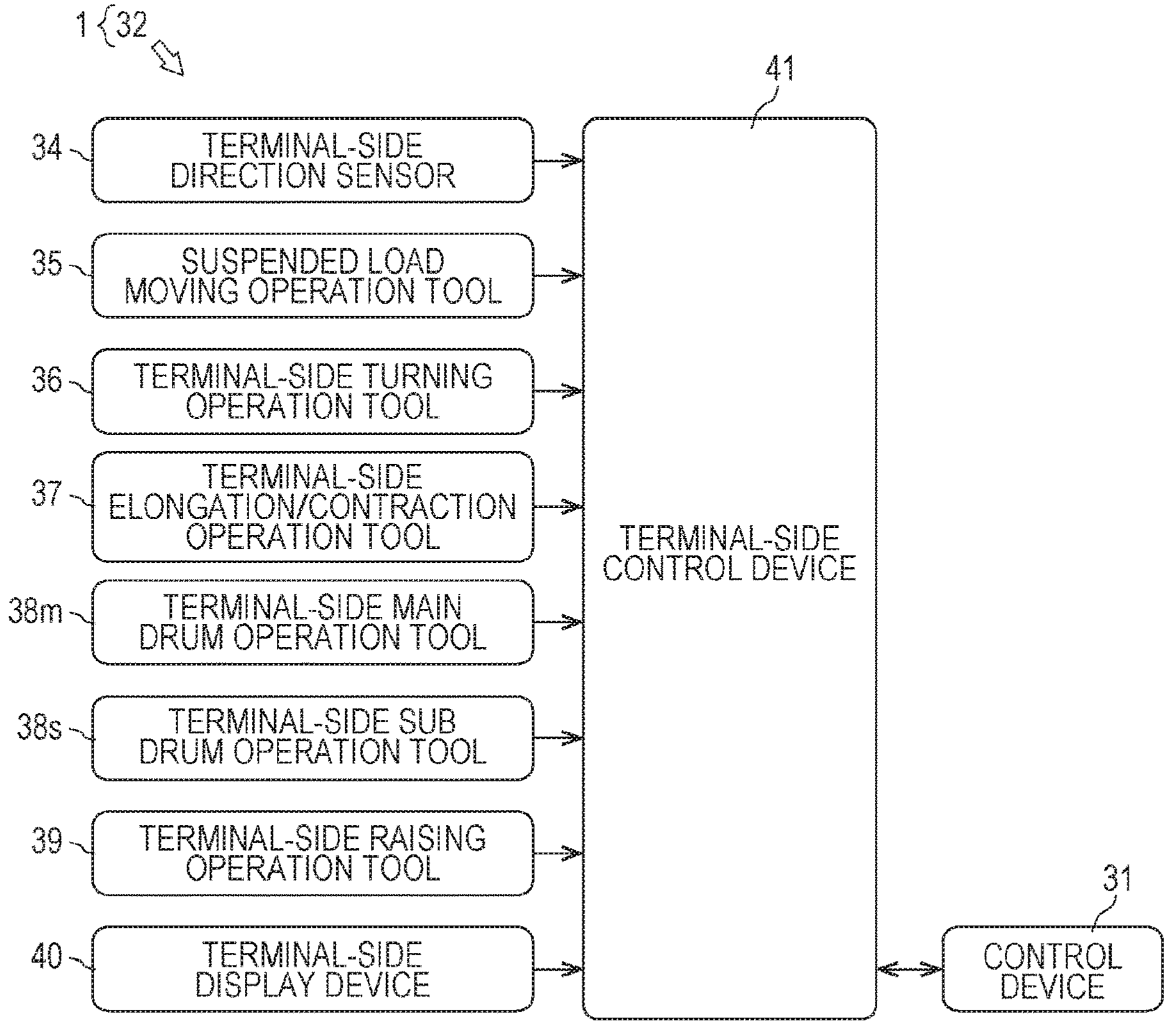
FIG. 4 is a block diagram illustrating a control configuration of the operation terminal.

As illustrated in FIG. 4, the terminal-side control device 41, which is the control unit, controls the operation terminal 32. The terminal-side control device 41 is provided in the housing 33 of the operation terminal 32. In practice, the terminal-side control device 41 may be configured such that a CPU, a RUM, a RAM, an HDD, and the like are connected via a bus, or may be configured using a one-chip LSI or the like.

The terminal-side control device 41 stores various programs and data for controlling the operations of the suspended load moving operation tool 35, the terminal-side turning operation tool 36, the terminal-side elongation/contraction operation tool 37, the terminal-side main drum operation tool 38*m*, the terminal-side sub drum operation tool 38*s*, the terminal-side raising operation tool 39, the terminal-side display device 40, and the like.

The terminal-side control device 41 is connected to the suspended load moving operation tool 35, the terminal-side turning operation tool 36, the terminal-side elongation/contraction operation tool 37, the terminal-side main drum operation tool 38*m*, the terminal-side sub drum operation tool 38*s*, and the terminal-side raising operation tool 39.

The terminal-side control device 41 acquires the operation signals corresponding to the tilt direction and the tilt amount of the operation stick of each of the operation tools 35 to 39 from each of the operation tools 35 to 39. The tilt direction of the operation stick of each of the operation tools 35 to 39 corresponds to the moving direction of the suspended load. In addition, the tilt amount of the operation stick of each of the operation tools 35 to 39 corresponds to the moving speed of the suspended load.

The terminal-side control device 41 generates the target speed signal Vd of the load W on the basis of the operation signal of each operation stick acquired from each sensor of the suspended load moving operation tool 35, the terminal-side turning operation tool 36, the terminal-side elongation/contraction operation tool 37, the terminal-side main drum operation tool 38*m*, the terminal-side sub drum operation tool 38*s*, and the terminal-side raising operation tool 39.

In the case of the present embodiment, the terminal-side control device 41 corresponds to an example of a target signal generation unit. The target signal generation unit generates a target signal regarding the moving direction and the moving speed of the suspended load on the basis of the information about an operation input for instructing the moving direction and the moving speed of the suspended load.

The operation input is input, for example, when the operator operates each of the operation tools 35 to 39. In the case of the present embodiment, the information about the operation input is the tilt direction and the tilt amount of each of the operation tools 35 to 39.

The information about the operation input is not limited to the tilt direction and the tilt amount of each of the operation tools 35 to 39. In addition, the operation input unit configured to input the operation input is not limited to the operation tools 35 to 39. The operation input unit may be, for example, a button switch (not illustrated) or a touch panel provided in a driver's seat of the crane. The operator may input an operation input for instructing an operation of the boom 9 that is the operable functional part by operating the switch.

The operation input is not limited to the input on the basis of the operation of each of the operation tools 25 to 39 performed by the operator. For example, the operation input may be an input on the basis of an operation of the button performed by the operator.

In addition, the operation input may be an operation signal for controlling (instructing) the operation of the boom 9, the operation signal received from a remote operation terminal for remotely operating the crane 1.

In addition, the operation input may be an operation signal for controlling (instructing) the operation of the boom 9, the operation signal acquired from an external terminal incorporating an application, for example, building information modeling (BIM) or the like, via a network (for example, the Internet).

In addition, the operation input may be an operation signal for controlling (instructing) the operation of the boom 9, the operation signal received from an external terminal such as a server via a network (for example, the Internet).

Further, the operation input is not limited to what is input by the operator via the operation input unit. That is, an operation signal for automatically controlling the operation of the boom 9 during an automatic operation of the crane 1 may be also regarded as an example of the operation input.

In addition, the terminal-side control device 41 is connected to the control device 31 of the crane device 6 via wired or wireless connection means. The terminal-side control device 41 transmits the generated target speed signal Vd of the load W to the control device 31 of the crane device 6. Note that the function of the terminal-side control device 41 may be incorporated in the crane device 6.

Figure 5:
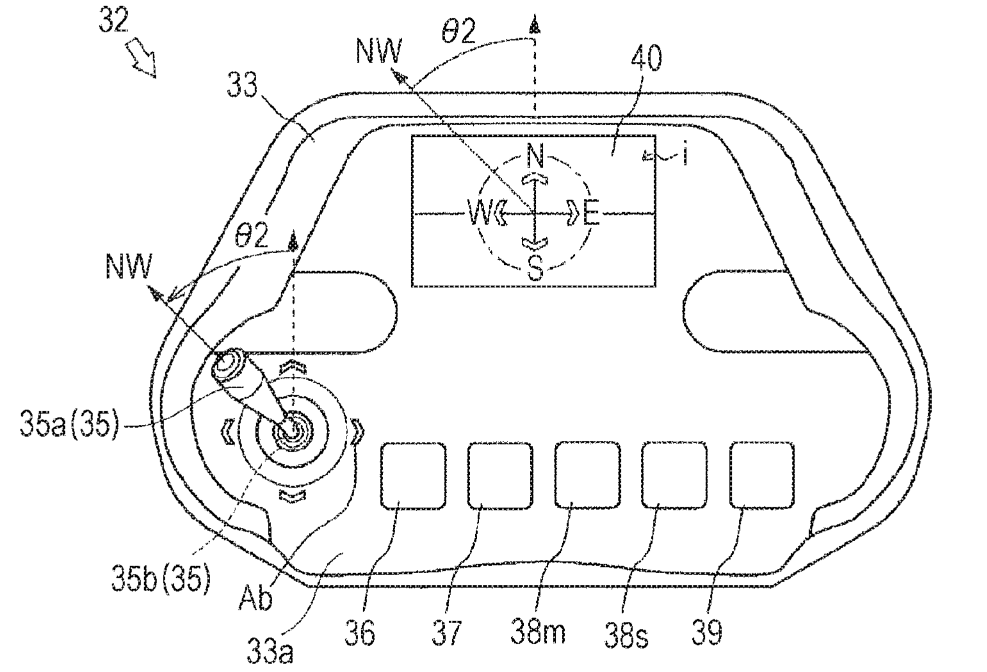
FIG. 5 is a view illustrating a direction in which a load is conveyed when a suspended load moving operation tool is operated.

Next, the control of the crane device 6 by the operation terminal 32 will be described with reference to FIG. 5.

First, with a distal end of the boom 9 facing north (see FIG. 5),

An example in which the operation stick 35*a* of the suspended load moving operation tool 35 of the operation terminal 32 is tilted leftward with respect to the upward direction by an arbitrary tilt amount in the tilt angle $\theta 2=45°$ direction will be described.

In this example, the terminal-side control device 41 acquires an operation signal corresponding to a tilt direction and a tilt amount from the north, which is the extending direction of the boom 9, to the northwest, which is a direction of a tilt angle $\theta 2=45°$, from the sensor 35*b* of the suspended load moving operation tool 35.

Further, the terminal-side control device 41 calculates the target speed signal Vd when moving the load W toward the northwest at the moving speed according to the tilt amount for each unit time t on the basis of the acquired operation signal (information about the operation input). The operation terminal 32 transmits the calculated target speed signal Vd to the control device 31 of the crane device 6 every unit time t. Note that the operation signal (information about the operation input) may be an operation input received by one operation input unit, or may include operation inputs received by two or more operation input units.

When receiving the target speed signal Vd from the operation terminal 32 for each unit time t, the control device 31 calculates a raising speed Vθ, a turning speed Vφ, and an elongation/contraction speed Vτ on the basis of the direction of the distal end of the boom 9. The control device 31 generates the operation signals Pd for the turning valve 22, the elongation/contraction valve 23, the raising valve 24, the main valve 25*m*, and the sub valve 25*s* i on the basis of the calculated raising speed Vθ, turning speed Vφ, and elongation/contraction speed Vτ (see FIG. 6).

The crane 1 moves the load 8 toward the northwest, which is the tilt direction of the suspended load moving operation tool 35, at the speed according to the tilt amount. At this time, the crane 1 controls the turning hydraulic motor 8, the elongation/contraction hydraulic cylinder 9*c*, the raising hydraulic cylinder 12, the main hydraulic motor 13*a*, and the like with the operation signal Md.

With this configuration, the crane 1 acquires the target speed signal Vd of the moving direction and speed on the basis of an operating direction of the suspended load moving operation tool 35 for each unit time t using the extending direction of the boom 9 from the operation terminal 32 as a reference, and calculates the raising speed Vθ, the turning speed. Vφ, and the elongation/contraction speed Vτ, and thus, the operator does not lose the recognition of an operating direction of the crane device 6 with respect to the operating direction of the suspended load moving operation tool 35.

That is, the operating direction of the suspended load moving operation tool 35 and the moving direction of the load W are calculated on the basis of the extending direction of the boom 9 as the common reference. As a result, the crane device 6 can be operated easily and simply. Note that the operation terminal 32 is provided inside the cabin 17 in the present embodiment. However, the operation terminal 32 may be a remote operation terminal that can be remotely operated from outside the cabin 17. In this case, the operation terminal 32 may wirelessly communicate with the crane device 6 by a terminal-side wireless device.

Next, a control process of generating a notch filter F in the control device 31 of the crane device 6 and generating a filtering operation signal Md for each driving device from the target speed signal Vd to which the notch filter F has been applied will be described with reference to FIGS. 6 to 12.

Figure 6:
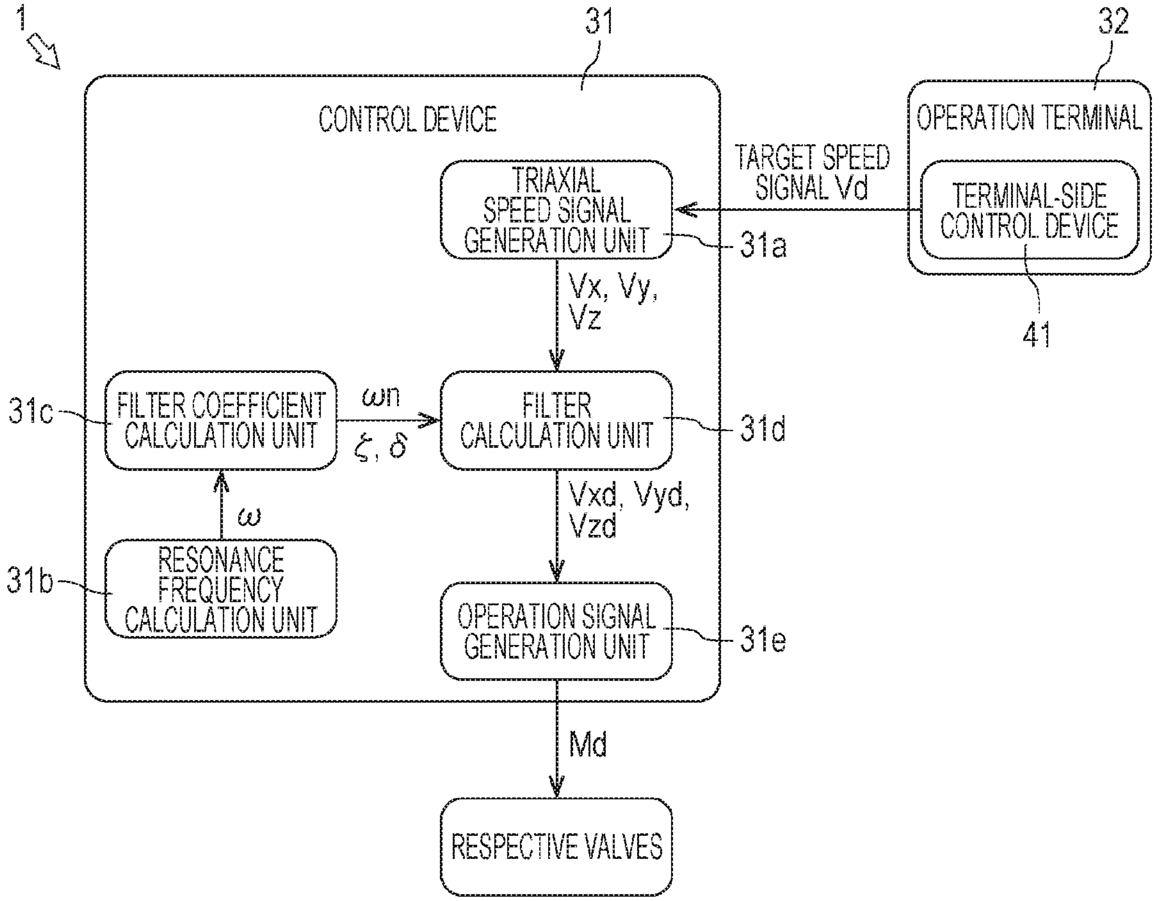
FIG. 6 is a block diagram illustrating a control configuration of a control device of the crane.

As illustrated in FIG. 6, the control device 31 includes a triaxial speed signal generation unit 31*a*, a resonance frequency calculation unit 31*b*, a filter coefficient calculation unit 31*c*, a filter calculation unit 31*d*, an operation signal generation unit 31*e*, and the like.

The control device 31 has a function as a filter unit that filters a target signal to generate a filtering target signal. Therefore, the control device 31 may be regarded as an example of the filter unit.

In addition, the control device 31 has a function as a control signal generation unit that generates speed control signals (operation signals Md) for controlling operation speeds of the driving devices (the turning hydraulic motor 8, the raising hydraulic cylinder 12, and the elongation/contraction hydraulic cylinder 9*c*) that drive the boom 9 on the basis of the information about the attitude (the turning angle of the boom 9, the raising angle of the boom 9, and the elongation/contraction length of the boom 9) and the filtering target signal. Therefore, the control device 31 may be regarded as an example of the control signal generation unit.

Note that the control device 31 can calculate an X coordinate Px, a Y coordinate Py, and a Z coordinate Pz of the load 8 (the main hook block 10 or the sub hook block 11) with an arbitrarily defined reference position O (for example, a turning center of the boom 9) as a reference, from detection values acquired from the winding sensor 26, the turning sensor 27, the elongation/contraction sensor 28, and the raising sensor 30.

The triaxial speed signal generation unit 31*a* generates speed signals in the X-axis direction, the Y-axis direction, and the Z-axis director: (hereinafter simply referred to as "three-axis directions") orthogonal to each other at the reference position O from the target speed signal Vd regarding the moving direction and moving speed of the load W.

The triaxial speed signal generation unit 31*a* generates an X-axis speed signal Vx, a Y-axis Speed signal Vy, and a Z-axis speed signal Vz of the load W from the target speed signal Vd.

The resonance frequency calculation unit 31*b* calculates a resonance frequency ω of shaking of the suspended load using the load W suspended on the main wire rope 14 or the sub wire rope 16 as a single pendulum.

Figure 7:
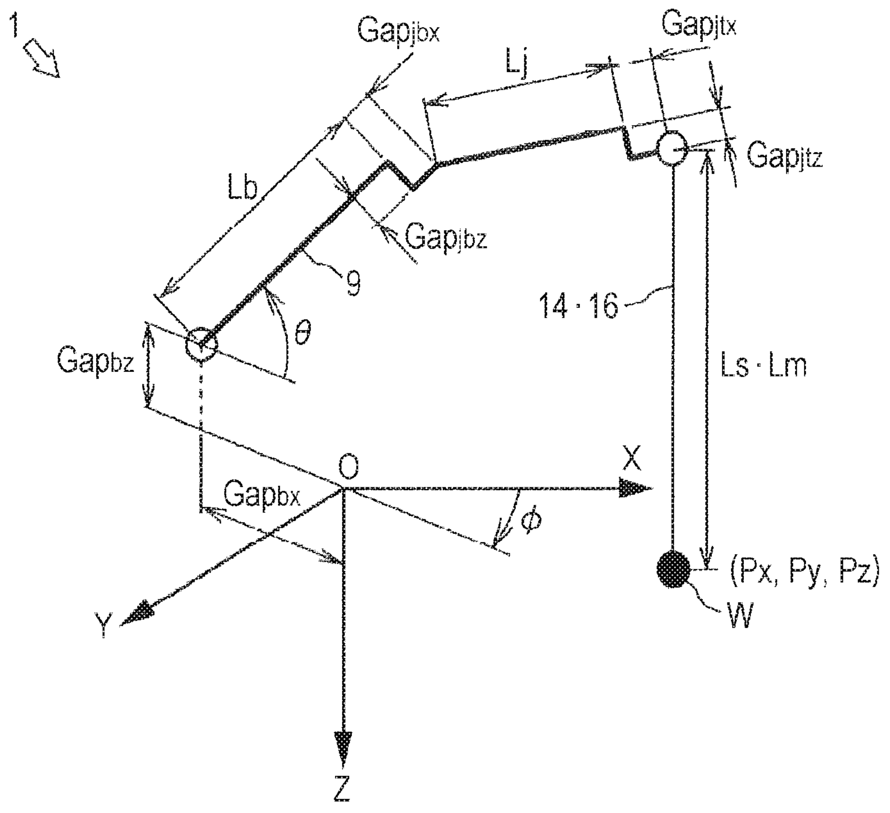
FIG. 7 is a view illustrating an inverse dynamic model of the crane.

The resonance frequency calculation unit 31*b* calculates a suspended length Lm related to the main wire rope 14 on the basis of the raising angle θ of the boom 9, the fed-out amount 1 of the main wire rope 14, and the number of parts of line of the main hook block 10 (see FIG. 7).

The resonance frequency calculation unit 31*b* calculates a suspended length Ls related to the sub wire rope 16 on the basis of the raising angle θ of the boom 9, the fed-out amount 1 of the sub wire rope 16, and the number of parts of line of the sub hook block 11 (see FIG. 7).

The suspended length Lm related to the main wire rope 14 is a length from a position where the main wire rope 14 is separated from a sheave to the main hook block 10. The suspended length Ls related to the sub wire rope 16 is a length from a position where the sub wire rope 16 is separated from a sheave to the sub hook block 11.

Then, the resonance frequency calculation unit 31*b* calculates resonance frequency $\omega=\sqrt{(g/L)}$ . . . (1) on the basis of a gravitational acceleration g and the suspended length Lm and/or the suspended length Ls. Note that L means the suspended length Lm or the suspended length Ls in Formula (1).

The filter coefficient calculation unit 31*c* calculates a center frequency coefficient $\omega_n$, a notch width coefficient ζ, and a notch depth coefficient δ of a transfer function H (s) of the notch filter F from the operating state of the crane 1 (see the equation (4) described later). The file, coefficient calculation unit 31*c* calculates the notch width coefficient ζ and the notch depth coefficient δ corresponding to the X coordinate Px, the Y coordinate Py, and the Z coordinate Pa of the load W, and calculates the corresponding center frequency coefficient $\omega_n$ with the resonance frequency ω as the center frequency ωc.

The filter calculation unit 31*d* generates the notch filter F that attenuates a specific frequency domain of the target speed signal. Vd. In addition, the filter calculation unit 31*d* applies the notch filter F to the X-axis speed signal Vx, the Y-axis speed signal Vy, and the Z-axis speed signal Vz.

The filter calculation unit 31*d* generates the notch filter F on the basis of the center frequency coefficient $\omega_n$, the notch width coefficient ζ, and the notch depth coefficient δ using. Formula (4) which will be described later. In addition, the filter calculation unit 31*d* applies the notch filter F to each of the X-axis speed signal Vx, the Y-axis speed signal Vy, and the Z-axis speed signal Vz to generate a filtering X-axis speed signal Vxd, a filtering Y-axis speed signal Vyd, and a filtering Z-axis speed signal Vzd in which a frequency component in an arbitrary frequency range has been attenuated at an arbitrary ratio with the resonance frequency ω as a reference.

The operation signal generation unit 31*e* generates the operation signals Md for the turning valve 22, the elongation/contraction valve 23, the raising valve 24, the main valve 25*m*, and the sub valve 25*s*. The operation signal generation unit 31*e* calculates a filtering raising speed signal Vθd, a filtering turning speed signal Vφd, and a filtering elongation/contraction speed signal Vτd on the basis of the filtering X-axis speed signal Vxd, the filtering Y-axis speed signal Vyd, and the filtering Z-axis speed signal Vzd.

Further, the operation signal generation unit 31*e* generates the operation signal Md for each of the turning valve 22, the elongation/contraction valve 23, the raising valve 24, the main valve 25*m*, and the sub valve 25*s* on the basis of the calculated filtering raising speed signal Vθd, filtering turning speed signal Vφd, and filtering elongation/contraction speed signal Vτd.

That is, the control device 31 controls the turning hydraulic motor 6, the raising hydraulic cylinder 12, the main hydraulic motor 13*a*, and the sub hydraulic motor 15*a* which are examples of the driving device (actuator) via the respective operation valves.

The triaxial speed signal generation unit 31*a* of the control device 31 is connected to the filter calculation unit 31*d*. The triaxial speed signal generation unit 31*a* acquires the target speed signal Vd from the operation terminal 32.

The resonance frequency calculation unit 31*b* of the control device 31 is connected to the filter coefficient calculation unit 31*c*. The resonance frequency calculation unit 31*b* acquires the fed-out amount 1 from the winding sensor 26.

The filter coefficient calculation unit 31*c* of the control device 31 is connected to the filter calculation unit 31*d*. The filter coefficient calculation unit 31*c* acquires the suspended length Lm of the main wire rope 14 and the suspended length Ls of the sub wire rope 16 (see FIG. 7) and the resonance frequency co from the resonance frequency calculation unit 31*b*.

In addition, the filter coefficient calculation unit 31*c* acquires the turning angle φ of the turning base 7, the elongation/contraction length τ of the boom 9, the raising angle θ of the boom 9, and the suspended length of the wire rope (the suspended length Lm of the main wire rope 14 or the suspended length Ls of the sub wire rope 16).

The filter calculation unit 31*d* of the control device 31 is connected to the operation signal generation unit 31*e*. The filter calculation unit 31*d* acquires the X-axis speed signal Vx, the Y-axis speed signal Vy, and the Z-axis speed signal Vz of the load W from the triaxial speed signal generation unit 31*a*. The filter calculation unit 31*d* acquires the notch width coefficient ζ, the notch depth coefficient δ, and the center frequency coefficient $\omega_n$ from the filter coefficient calculation unit 31*c*.

The operation signal generation unit 31*e* of the control device 31 is connected to the turning valve 22, the elongation/contraction valve 23, the raising valve 24, the main valve 25*m*, and the sub valve 25*s*. The operation signal generation unit 31*e* acquires the filtering X-axis speed signal Vxd, the filtering Y-axis speed signal Vyd, and the filtering Z-axis speed signal Vzd from the filter calculation unit 31*d*.

Then, with the above-described procedure, the operation signal generation unit 31*e* generates the operation signal Md for the turning valve 22, the raising valve 24, the main valve 25*m*, and the sub valve 25*s*, and outputs the operation signal Md to the corresponding operation valve.

As illustrated in FIG. 7, the relationship between the X coordinate Px, the Y coordinate Py, and the Z coordinate Pz of the load W (the main hook block 10 or the sub hook block 11), and the raising angle θ of the boom 9, the turning angle φ, and the elongation/contraction length τ is expressed by the following. Formula (2) using an equivalent length Lx of the boom 9 in the extending direction and an equivalent length Lz of the boom. 9 in the vertical direction in the inverse dynamic model.

In addition, the relationship between the X-axis speed signal Vx, the Y-axis speed signal Vy, and the Z-axis speed signal Vs of the load W, and the raising speed Vθ of the boom 9, the turning speed Vφ, and the elongation/contraction speed Vτ is expressed by the following Formula (3) obtained by differentiating Formula (2) with respect to time t.

[Expression 1]

$$\begin{bmatrix} Px \\ Py \\ Pz \end{bmatrix} = \begin{bmatrix} (LxC\theta + LzS\theta - Gap_{bx})C\phi \\ (LxC\theta + LzS\theta - Gap_{bx})S\phi \\ -(LxS\theta - LzC\theta - \iota + Gap_{bz}) \end{bmatrix} \tag{2}$$

Each symbol in Formula (2) is defined as follows.

Equivalent length in extending direction: $Lx=Lb+Gap_{jbx}+(Lj+Gap_{jtx})C_{\tau}$ Equivalent length in vertical direction: $Lz=Gap_{jbz}+(Lj+Gap_{jtx})S_{\tau}+Gap_{jbz}C_{\tau}$ Length. of boom 9: Lb Length of jib 9*a*: Lj Length of boom 9 in extending direction from center of main hoisting sheave to fulcrum: $Gap_{jbx}$ Length from raising fulcrum to jib angle fulcrum in direction perpendicular to boom 9: $Gap_{jbz}$ Length in jib extending direction from distal end of jib 9*a* to center of auxiliary hoisting sheave: $Gap_{jtx}$ Length from distal end of jib 9*a* to center of auxiliary hoisting sheave in direction perpendicular to jib 9*a*: $Gap_{jbz}$ Distance from turning center O to raising fulcrum in X direction: $Gap_{bx}$ Distance from turning center O to raising fulcrum in Z direction: $Gap_{bz}$ Angle of Jib 9*a*: τ sin: S cos: C

[Expression 2]

$$\begin{bmatrix} Vx \\ Vy \\ Vz \end{bmatrix} = \begin{bmatrix} (LxC\theta + LzS\theta - Gap_{bx})C\phi & -(LxC\theta + LzS\theta - Gap_{bx})S\phi & 0 \\ (LxC\theta + LzS\theta - Gap_{bx})S\phi & (LxC\theta + LzS\theta - Gap_{bx})C\phi & 0 \\ -(LxC\theta + LzS\theta) & 0 & 1 \end{bmatrix} \begin{bmatrix} V\theta \\ V\phi \\ V\iota \end{bmatrix} \tag{3}$$

Next, the notch filter F will be described with reference to FIGS. 8 and 9. The notch filter F is a filter that sharply attenuates the target speed signal Vd having an arbitrary frequency as the center.

Figure 8:
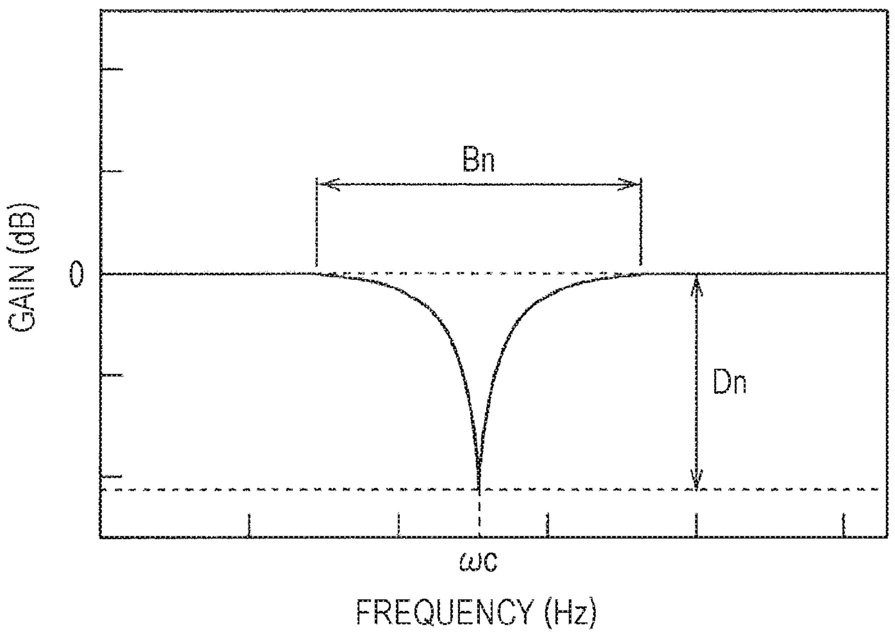
FIG. 8 is a view illustrating a graph representing a frequency characteristic of a notch filter.
Figure 9:
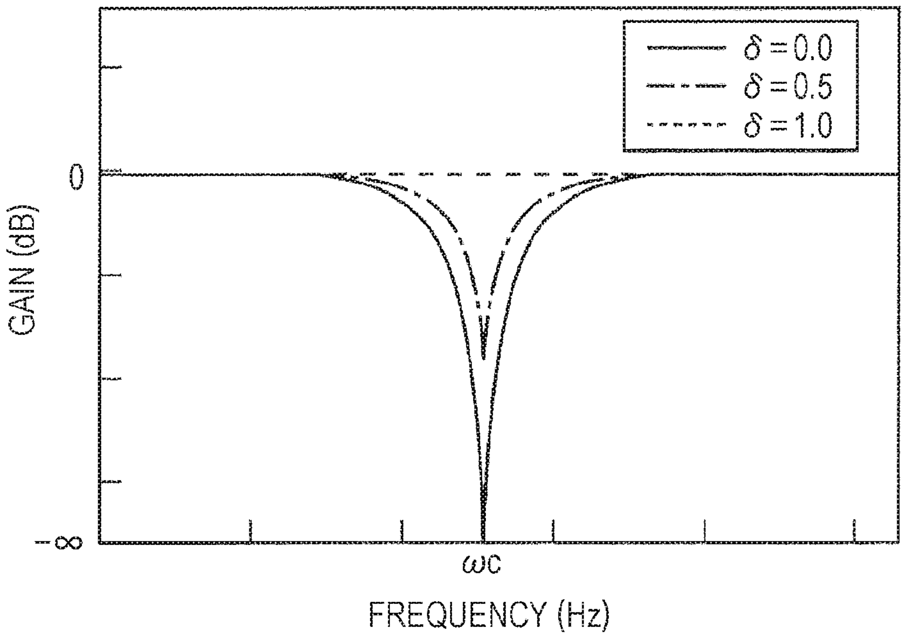
FIG. 9 is a view illustrating a graph representing frequency characteristics when notch depth coefficients are different in the notch filter.

As illustrated in FIG. 8, the notch filter F is a filter having a frequency characteristic of attenuating a frequency component of a notch width Bn, which is an arbitrary frequency range having an arbitrary center frequency cc as the center, with a notch depth Dn which is an arbitrary frequency attenuation ratio of the center frequency ωc. That is, the frequency characteristic of the notch filter F is set by the center frequency ωc, the notch width Bn, and the notch depth Dn.

The notch filter F has a transfer function H(s) illustrated in the following Formula (4).

[Expression 3]

$$H(s) = \frac{s^2 + 2\delta\zeta\omega_n s + \omega_n^2}{s^2 + 2\zeta\omega_n s + \omega_n^2} \tag{4}$$

In Formula (4), $\omega_n$ is a center frequency coefficient $\omega_n$ corresponding to the center frequency ωc of the notch filter F. In Formula (4), ζ is a notch width coefficient ζ corresponding to the notch width Bn. In Formula (4), δ is a notch depth coefficient δ corresponding to the notch depth Dn.

In addition, in the notch filter F, the center frequency ωc of the notch filter F is changed as the center frequency coefficient $\omega_n$ is changed. In the notch filter F, the notch width Bn of the notch filter F is changed as the notch width coefficient ζ is changed. In the notch filter F, the notch depth Dn of the notch filter F is changed as the notch depth coefficient δ is changed.

The notch width coefficient ζ is set to be larger as the notch width Bn is set to be larger. As a result, the frequency range to be attenuated from the center frequency ωc in an applied input signal is set by the notch width coefficient ζ in the notch filter F.

The notch depth coefficient δ is set between 0 and 1. As illustrated in FIG. 9, when the notch depth coefficient δ=0, the notch filter F has a gain characteristic of ∞ dB at the center frequency ωc of the notch filter F. As a result, the notch filter F has the maximum attenuation degree at the center frequency ωc in the applied input signal. That is, the notch filter F attenuates the input signal at maximum according to its frequency characteristic and outputs the attenuated input signal.

When the notch depth coefficient δ=1, the notch filter F has a gain characteristic of 0 dB at the center frequency cc of the notch filter F. As a result, the notch filter F does not attenuate all frequency components of the applied input signal. That is, the notch filter F outputs the input signal as it is.

The driving device, which is controlled with the operation signal Md to which the notch filter F with the notch depth coefficient δ close to 0 (deep notch depth Dn) has been applied has slower responsiveness to the operation of the suspended load moving operation tool 35 as compared to a case where control is performed with the operation signal Md to which the notch filter F with the notch depth coefficient δ close to 1 (shallow notch depth Dn) has been applied or the operation signal Md to which the notch filter F has not been applied, so that the operability deteriorates.

Similarly, the driving device, which is controlled with the operation signal Md to which the notch filter F with the notch width coefficient ζ relatively larger than a standard value (relatively wide notch width Bn) has been applied has slower responsiveness to the operation of the suspended load moving operation tool 35 as compared to a case where control is performed with the operation signal Md to which the notch filter F with the notch width coefficient ζ relatively smaller than the standard value (relatively narrows notch width Bn) has been applied or the operation signal Md to which the notch filter F has not been applied, so that the operability deteriorates.

In vibration suppression control, when the crane 1 is operated by the operation of the suspended load moving operation tool 35 of the operation terminal 32, the control device 31 acquires the target speed signal Vd generated on the basis of the operation of the suspended load moving operation tool 35. Then, the control device 31 sets the notch filter F having the notch depth coefficient δ, which is an arbitrary value, on the basis of the X coordinate Px, the Y coordinate Py, and the 2: coordinate Pr of the load W (the main hook block 10 or the sub hook block 11).

For example, in the case of automatic control in which the vibration suppression effect is preferentially desired, the control device 31 sets the notch depth coefficient Δ of the notch filter F to a value close to 0 (for example, notch depth coefficient δ=0.3). Such a notch filter F can greatly attenuate the frequency component having the resonance frequency ω as the center.

The control device 31 applies the generated notch filter F to the X-axis speed signal Vx, the Y-axis speed signal Vy, and the Z-axis speed signal Vz. This enhances the vibration suppression effect at the resonance frequency ω of the load W in the conveyance work of the load by the crane 1.

On the other hand, in the case of control in which the operability of the suspended load moving operation tool 35 is preferentially desired, the control device 31 sets the notch depth coefficient δ of the notch filter F to a value close to 1 (for example, notch depth coefficient δ=0.7). Such a notch filter F has a small attenuation rate of the frequency component having the resonance frequency ω as the center.

The control device 31 applies the generated notch filter F to the X-axis speed signal Vx, the Y-axis speed signal Vy, and the Z-axis speed signal Vs. As a result, in the conveyance work of the load by the crane 1, the maintenance of the operability by the suspended load moving operation tool 35 is given priority over the enhancement of the vibration suppression effect of the load W at the resonance frequency ω.

In other words, the crane 1 can generate the filtering X-axis speed signal Vxd, the filtering Y-axis speed signal Vyd, and the filtering Z-axis speed signal Vzd with the notch filter F having the frequency characteristic according to the skill and preference of the operator.

Hereinafter, the vibration suppression control on the basis of an operating state of the crane 1 in the control device 31 will be specifically described with reference to FIGS. 10 to 12. In the present embodiment, the control device 31 sets at least one of the notch depth coefficient δ and the notch width coefficient ζ of the notch filter F according to the operating state of the crane 1, the skill of the operator, or the preference of the operator.

In the following embodiment, the notch filter F sets the notch depth coefficient δ to an arbitrary value according to the operating state of the crane 1 and the like, and sets the notch width coefficient ζ to a predetermined fixed value, but may adopt a configuration in which the notch width coefficient ζ is also changed to an arbitrary value according to the operating state of the crane 1 and the like.

In addition, it is assumed that the control device 31 calculates the center frequency coefficient $\omega_n$ using only the resonance frequency ω calculated by the resonance frequency calculation unit 31*b* as the center frequency ωc serving as the reference of the notch filter F. It is assumed that the control device 31 generates the operation signal Md every scan time on the basis of the target speed signal Vd acquired from the operation terminal 32 in the triaxial speed signal generation unit 31*a*.

Figure 10:
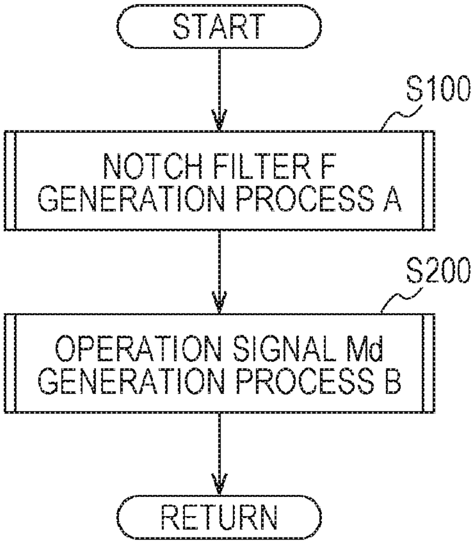
FIG. 10 is a view illustrating a flowchart illustrating an overall control mode of vibration suppression control according to an embodiment of the present invention.
Figure 11:
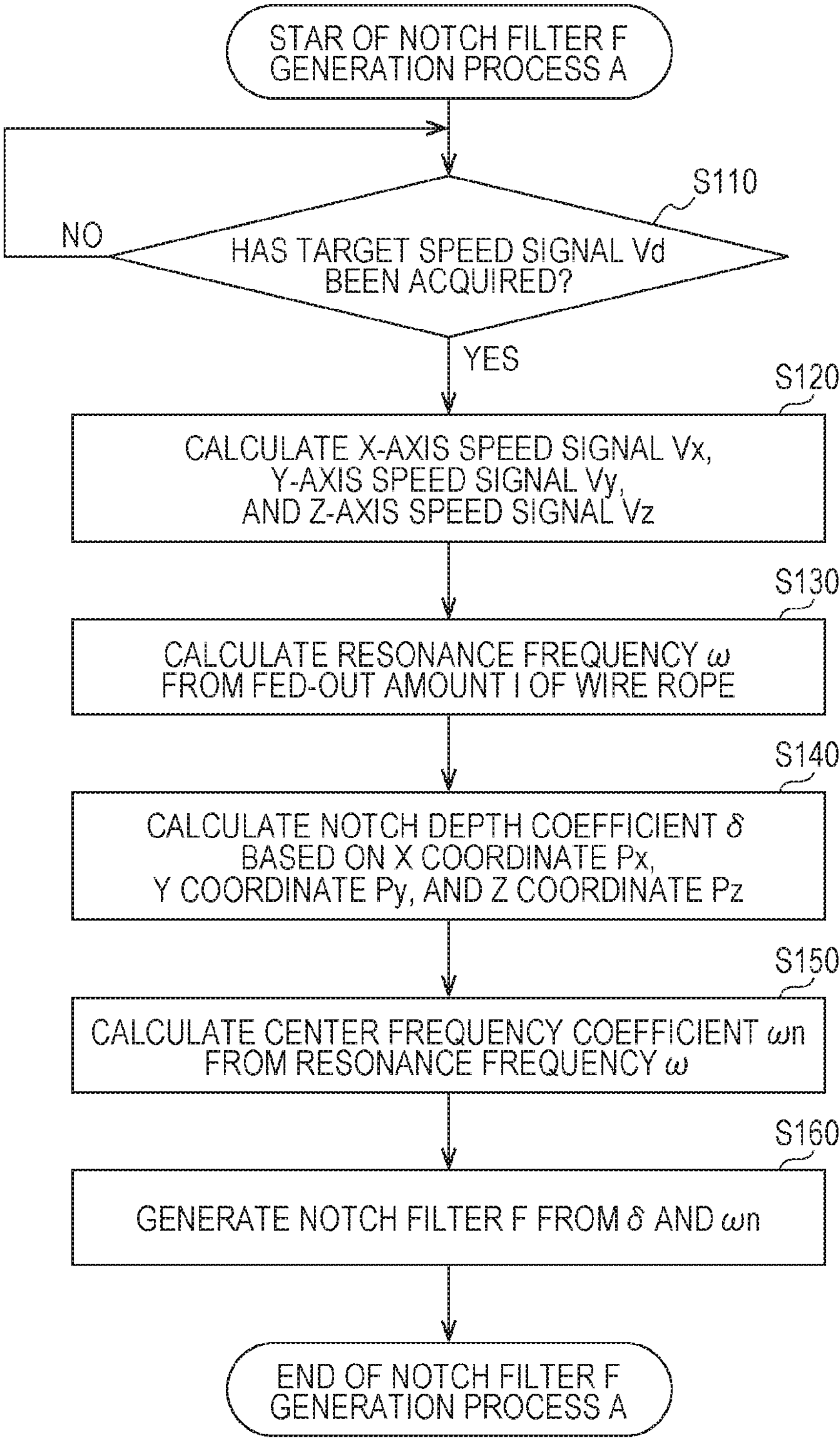
FIG. 11 is a view illustrating a flowchart illustrating a notch filter generation step in the operation of the operation terminal in vibration suppression control according to the embodiment of the present invention.

As illustrated in FIG. 10, in Step S100, the control device 31 starts a notch filter F generation process A in the vibration suppression control of the crane 1 and shifts the control processing to Step S110 (see FIG. 11). Then, when the notch filter F generation process A ends, the control device 31 shifts the control processing to Step S200 (see FIG. 10).

Figure 12:
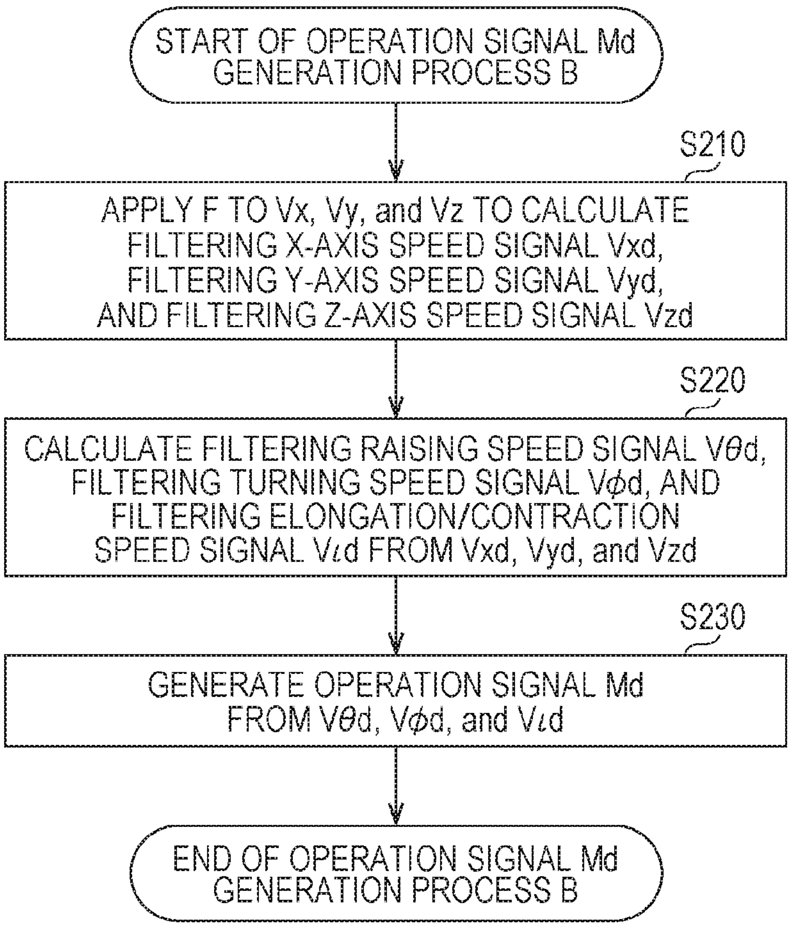
FIG. 12 is a view illustrating a flowchart illustrating an operation signal generation step in the operation of the operation terminal in the vibration suppression control according to the embodiment of the present invention.

In Step S200, the control device 31 starts an operation signal Md generation process B in the vibration suppression control of the crane 1 and shifts the control processing to Step S210 (see FIG. 12). Then, when the operation signal Md generation process B ends, the control device 31 shifts the control processing to Step S100 (see FIG. 10).

As illustrated in FIG. 11, in Step S110 of the vibration suppression control, the triaxial speed signal generation unit 31*a* of the control device 31 determines whether or not the target speed signal Vd of the load W has been acquired.

As a result, if the target speed signal Vd of the load W has been acquired ("YES" in Step S110), the control device 31 shifts the control processing to Step S120.

On the other hand, if the target speed signal Vd of the load W has not been acquired ("NO" in Step S110), the control device 31 shifts the step to S110.

In Step S120, the triaxial speed signal generation unit 31*a* calculates the X-axis speed signal Vx, the Y-axis speed signal Vy, and the Z-axis speed signal Vz of the load W on the basis of the acquired target speed signal Vd. Then, the control processing transitions to Step S130.

In Step S130, the resonance frequency calculation unit 31*b* of the control device 31 calculates the resonance frequency ω from the fed-out amount 1 of the wire rope by the above. Formula (1). Then, the control device 31 shifts the control processing to Step S140.

In Step S140, the filter coefficient calculation unit 31*c* of the control device 31 calculates the notch depth coefficent δ on the basis of the X coordinate Px, the Y coordinate Py, and the Z coordinate Pz of the load W. Then, the control device 31 shifts the control processing to Step S150.

In Step S150, the filter coefficent calculation unit 31*c* calculates the center frequency coefficient $\omega_n$ using the calculated resonance frequency ω as the center frequency ωc. Then, the control device 31 shifts the control processing to Step S160.

Note that, as a modification, in Step S150, the filter coefficient calculation unit 31*c* may calculate the center frequency coefficient $\omega_n$ using a combined frequency of the calculated resonance frequency ω and a natural vibration frequency, excited when a structure forming the crane 1 (for example, the boom 9 and the jib 9*a*) vibrates due to an external force, as the center frequency ωc. According to such a modification, not only the vibration caused by the resonance frequency ω(n) but also the vibration caused by the natural vibration frequency of the structure forming the crane 1 can be suppressed together.

In Step S160, the filter calculation unit 31*d* of the control device 31 generates the notch filter F on the basis of the calculated notch depth coefficient δ and center frequency coefficient $\omega_n$. Then, the control device 31 ends the notch filter F generation process A and shifts the control processing to Step S200 (see FIG. 10).

As illustrated in FIG. 12, in Step S210 of the operation signal. Md generation process B, the filter calculation unit 31*d* of the control device 31 applies the notch filter F to the calculated X-axis speed signal VH, Y-axis speed signal Vy, and Z-axis speed signal Vz of the load W to calculate the filtering-axis speed signal Vxd, the filtering Y-axis speed signal Vyd, and the filtering Z-axis speed signal Vzd. Then, the control device 31 shifts the control processing to Step S220.

In Step S220, the operation signal generation unit 31*e* calculates the filtering raising speed signal Vθd, the filtering turning speed signal V(pd, and the filtering elongation/contraction speed signal Vτd on the basis of the calculated filtering-axis speed signal Vxd, filtering Y-axis speed signal Vyd, and filtering Z-axis speed signal Vzd. Then, the control device 31 shifts the control processing to Step S230.

In Step S230, the operation signal generation unit. 31*e* generates the operation signal Md for each of the turning valve 22, the elongation/contraction valve 23, the raising valve 24, the main valve 25*m*, and the sub valve 25*s* on the basis of the calculated filtering raising speed signal Vθd, filtering turning speed signal Vφd, and filtering elongation/contraction speed signal Vζd. Then, the control device 31 ends the operation signal Md generation process B and shifts the control processing to Step S100 (see FIG. 10).

In this manner, the crane 1 applies the notch filter F to the X-axis speed signal Vx, the Y-axis speed signal Vy, and the Z-axis speed signal Vz of the load W calculated on the basis of the target speed signal Vd of the load W to generate the filtering raising speed signal Vθd, the filtering turning speed signal Vφd, and the filtering elongation/contraction speed signal Vτd.

For this reason, the conveyance locus of the load W in which the motions of the respective driving devices are combined does not become geometrically non-linear. In addition, the crane 1 defines the frequency range to be attenuated by the notch filter F and the attenuation ratio according to the operating state of the crane 1 defined on the basis of the X coordinate Px, the Y coordinate Py, and the Z coordinate Pz of the load W. That is, the crane 1 performs the vibration suppression control by the notch filter F suitable for the operating state. As a result, the load can be conveyed along the locus suitable for conveyance of the load while suppressing shaking of the load.

The resonance frequency of the crane 1 refers to a vibration frequency such as a natural frequency of the boom 9 in the raising direction and the turning direction, a natural frequency of the boom 9 caused by twisting about an axis, a resonance frequency of a double pendulum constituted by the main hook block 10 or the sub hook block 11 and the slinging wire rope, and a natural frequency during elongation/contraction vibration caused by the extension of the main wire rope 14 or the sub wire rope 16.

In the vibration suppression control according to the present invention, the notch filter F, which attenuates a signal in the specific frequency range with the resonance frequency as the center frequency, is applied in the crane 1, it is sufficient to apply what attenuates a specific frequency such as a low-pass filter, a high-pass filter, and a band-stop filter.

The above-described embodiment merely illustrates a typical form, and various modifications can be implemented within a scope not departing from a gist of the embodiment. Needless to say, the present invention can be implemented in various forms and the scope of the present invention encompasses those illustrated in the description of the claims, those having meanings equivalent to those in the claims, and all alterations within the scope.

[Appendix]

One mode (Reference Example 1) of a reference example of a crane according to the present invention is a crane that calculates a resonance frequency of shaking of a load and controls actuators with a filtering control signal in which a frequency component in an arbitrary frequency range has been attenuated at an arbitrary ratio with the resonance frequency as a reference, and the crane includes:

an operation tool for inputting moving direction and speed of the load;

turning angle detection means of a boom;

raising angle detection means of the boom;

elongation/contraction length detection means of the boom; and fed-out amount detection means of a wire rope, calculates the resonance frequency of the shaking of the load from the fed-out amount of the wire rope detected by the fed-out amount detection means, generates a target speed signal regarding the moving direction and speed of the load on the basis of an operation signal of the operation tool, generates a filtering speed signal in which a frequency component in an arbitrary frequency range has been attenuated at an arbitrary ratio with a resonance frequency as a reference, from the target speed signal, and generates a filtering operation signal regarding an operation speed of each of the actuators from the filtering speed signal on the basis of a turning angle detected the turning angle detection means, a raising angle detected by the raising angle detection means, and an elongation/contraction length detected by the elongation/contraction length detection means.

In one mode (Reference Example 2) of the crane according to Reference Example 1 as described above, the target speed signal is constituted by an X-axis speed signal, a Y-axis speed signal and a Z-axis speed signal, the filtering speed signal is generated from the speed signals of the respective axes, and a filtering raising speed signal, a filtering turning speed signal, and a filtering elongation/contraction speed signal are generated on the basis of the filtering speed signal in each axis direction to control the corresponding actuator as the filtering operation signal.

In addition, in one mode (Reference Example 3) of the crane according to Reference Example 1 or Reference Example 2 as described above, a frequency range to be attenuated by a notch filter and an arbitrary ratio thereof are set on the basis of a turning angle detected by the turning angle detection means, a raising angle detected by the raising angle detection means, and an elongation/contraction length detected by the elongation/contraction length detection means.

The disclosure content of the description, drawings, and abstract included in the Japanese Patent Application No. 2018-135406 filed on Jul. 18, 2018 is incorporated herein by reference in its entirety.

INDUSTRIAL APPLICABILITY

The crane according to the present invention is applicable to various cranes as well as the mobile crane.

REFERENCE SIGNS LIST

1 crane
2 vehicle
3 wheel
4 engine
5 outrigger
6 crane device
7 turning base
8 turning hydraulic motor
9 boom
9*a* jib
9*b* boom camera
9*c* elongation/contraction hydraulic cylinder
10 main hook block
11 sub hook block
12 raising hydraulic cylinder
13 main winch
13*a* main hydraulic motor
14 main wire rope
15 sub winch
15*a* sub hydraulic motor
16 sub wire rope
17 cabin
18 turning operation tool
19 raising operation tool
20 elongation/contraction operation tool
21*m* main drum operation tool
21*s* sub drum operation tool
22 turning valve
23 elongation/contraction valve
24 raising valve
25*m* main valve
25*s* sub valve
26 winding sensor
27 turning sensor
28 elongation/contraction sensor
29 direction sensor
30 raising sensor
31 control device
31*a* triaxial speed signal generation unit
31*b* resonance frequency calculation unit
31*c* filter coefficient calculation unit
31*d* filter calculation unit
31*e* operation signal generation unit
32 operation terminal
33 housing
33*a* operation surface
34 terminal-side direction sensor
35 suspended load moving operation tool
35*a* operation stick
35*b* sensor
36 terminal-side turning operation tool
37 terminal-side elongation/contraction operation tool
38*m* terminal-side main drum operation tool
38*s* terminal-side sub drum operation tool
39 terminal-side raising operation tool
40 terminal-side display device
41 terminal-side control device
W load
ω resonance frequency
Vd target speed signal

The invention claimed is:

1. A crane comprising:

a boom that is supported on a pair of lower bases and is configured to turn, raise, and elongate/contract;

one or more motors and/or cylinders that drives the boom;

one or more sensors that detects information about an attitude of the boom;

one or more processors comprising:

a target signal generation unit that generates a target signal regarding a moving direction and a moving speed of a suspended load based on information about an operation input for instructing the moving direction and the moving speed of the suspended load;

a filter unit that generates a filtering target signal by filtering the target signal;

a control signal generation unit that generates a speed control signal for controlling an operation speed of the driving device based on the information about the attitude and the filtering target signal; and a control unit that controls the one or more motors and/or cylinders based on the speed control signal, wherein the filter unit generates a notch filter based on a combined frequency of a resonance frequency regarding a wire rope suspended from the boom and a natural vibration frequency excited when the boom vibrates due to an external force.

2. The crane according to claim 1, wherein the one or more motors and/or cylinders comprises: a turning motor that turns the boom; a raising cylinder that raises the boom; and an elongation/contraction cylinder that elongates/contracts the boom, and the control signal generation unit generates the speed control signal for controlling each operation speed of the turning motor, the raising cylinder, and the elongation/contraction cylinder, based on the information about the attitude and the filtering target signal.

3. The crane according to claim 2, wherein the target signal includes a target speed signal in an X-axis direction, a target speed signal in a Y-axis direction, and a target speed signal in a Z-axis direction, and the control signal generation unit generates the speed control signal of each of the turning motor, the raising cylinder, and the elongation/contraction cylinder based on the target speed signal in the X-axis direction, the target speed signal in the Y-axis direction, and the target speed signal in the Z-axis direction.

4. The crane according to claim 1, wherein
the information about the attitude is a turning angle, a raising angle, and an elongation/contraction length of the boom.

5. The crane according to claim 4, wherein
the filter unit sets a frequency range to be attenuated by the notch filter and an arbitrary ratio of the attenuation based on the turning angle of the boom, the raising angle of the boom, and the elongation/contraction length of the boom.

6. The crane according to claim 1, further comprising
an operation tool that receives an input regarding the moving direction of the suspended load and an input regarding the moving speed based on an operation of the operation tool by an operator,
wherein the input regarding the moving direction corresponds to a tilt direction of the operation tool, and
the input regarding the moving speed corresponds to a tilt amount of the operation tool.

* * * * *